United States Patent [19]

Pone, Jr.

[11] 4,174,173
[45] Nov. 13, 1979

[54] PHOTOGRAPHIC PRINTER WITH INTERACTIVE COLOR BALANCING

[75] Inventor: John Pone, Jr., Minneapolis, Minn.

[73] Assignee: Pako Corporation, Minneapolis, Minn.

[21] Appl. No.: 848,738

[22] Filed: Nov. 4, 1977

[51] Int. Cl.² ............................................. G03B 27/78
[52] U.S. Cl. ..................................... 355/38; 355/77; 355/88
[58] Field of Search .................................. 355/35–38, 355/77, 88

[56] References Cited

U.S. PATENT DOCUMENTS

| | | | |
|---|---|---|---|
| 3,521,952 | 7/1970 | Nelson et al. | 355/38 |
| 3,873,200 | 3/1975 | Crete et al. | 355/38 |
| 3,927,938 | 12/1975 | Seigenji | 355/38 |

Primary Examiner—L. T. Hix
Assistant Examiner—W. J. Brady
Attorney, Agent, or Firm—Kinney, Lange, Westman and Fairbairn

[57] ABSTRACT

In the photographic printer of the present invention, color balancing is performed through an interactive procedure with the user. A test print of a reference film negative is made and the densities of the test print are measured and entered into the printer by the user. The printer derives and displays modified exposure times for the reference negative from the density of the reference negative, the desired reference print density values and the measured density values of the test print. The printer then performs a series of density measuring and exposure time calculating cycles during which time, if the modified exposure times differ from desired reference exposure times, the user changes the color content of the print lamp light by moving subtractive filters. The calculated exposure times are displayed so that the operator can monitor the changes in exposure time for each color channel as the subtractive filters are adjusted. The procedure continues until the displayed exposure times equal the desired reference exposure times.

8 Claims, 2 Drawing Figures

PHOTOGRAPHIC PRINTER WITH INTERACTIVE COLOR BALANCING

REFERENCE TO CO-PENDING APPLICATIONS

Reference is made to co-pending applications Ser. No. 848,736 by F. Laciak and J. Poné entitled "Exposure Time Control"; and Ser. No. 848,739 by J. Poné entitled "Photographic Printer with Automatic Density and Color Corrections for Paper Gamma"; which were filed on even date and are assigned to the same assignee as the present application.

BACKGROUND OF THE INVENTION

The present invention relates to photographic printing systems. In particular, the present invention is an improved color balancing technique for use in a photographic printer.

Photographic printers produce color or black and white prints or transparencies from photographic film originals (generally negatives). High intensity light is passed through the film and imaged on the photosensitive print medium (film or paper). The photographic emulsion layers on the print paper or film are exposed and subsequently processed to produce a print or transparency of the scene contained in the film original.

A critical portion of a photographic printer is the exposure control, which controls the exposure of the photosensitive medium to ensure that the image on the photosensitive medium is properly exposed. The exposure control may utilize inputs from several different sources in order to determine the proper exposure. For example, most automatic printers use large area transmission density (LATD) sensors to sample light transmitted by the negative either prior to or during an exposure. Control of the exposure is determined using a method known as "integration to grey". In addition, many automatic printers include an automatic density correction (ADC) or color/density scanning station which scans the negative prior to printing and corrects the exposure in the event of a condition known as "subject failure". Finally, the operator may enter density correction signals from the operator control panel. Based upon some or all of these input signals, the exposure control determines the proper exposure for each of the color channels or for one black and white channel.

In most photographic printers, the color content of the light passed through the negative is adjusted by means of subtractive filters. Complicated, time-consuming, "color balancing" procedures have been used to properly position or select the filters so that the printing light has the proper spectral content. While the prior art color balancing techniques have been generally effective, improved techniques are desirable. In particular, new techniques are needed which use less print paper in color balancing tests, which are less subjective, are less complicated, and require less time.

SUMMARY OF THE INVENTION

The photographic printer of the present invention utilizes an interactive color balancing procedure which is fast, simple, accurate and economical in its use of print paper for color balancing tests. A test print is made from a reference film, and the resulting densities of the test print are measured. These measured print densities are used together with stored reference print density values and measured densities of the reference film to derive modified exposure times for the reference film. The color content of print lamp light may then be modified to bring the exposure times for the reference film from the modified exposure time back to the reference exposure times.

DETAILED DESCRIPTION OF THE PREFERRED EMBODIMENTS

The photographic printer of the present invention provides color balancing through an interactive procedure. The printer, through its display, leads the operator through the procedures necessary to achieve color balance. The color balancing can usually be performed with only two or three test runs, so that waste of print paper and waste of user and printer time is significantly reduced.

Figure 1:
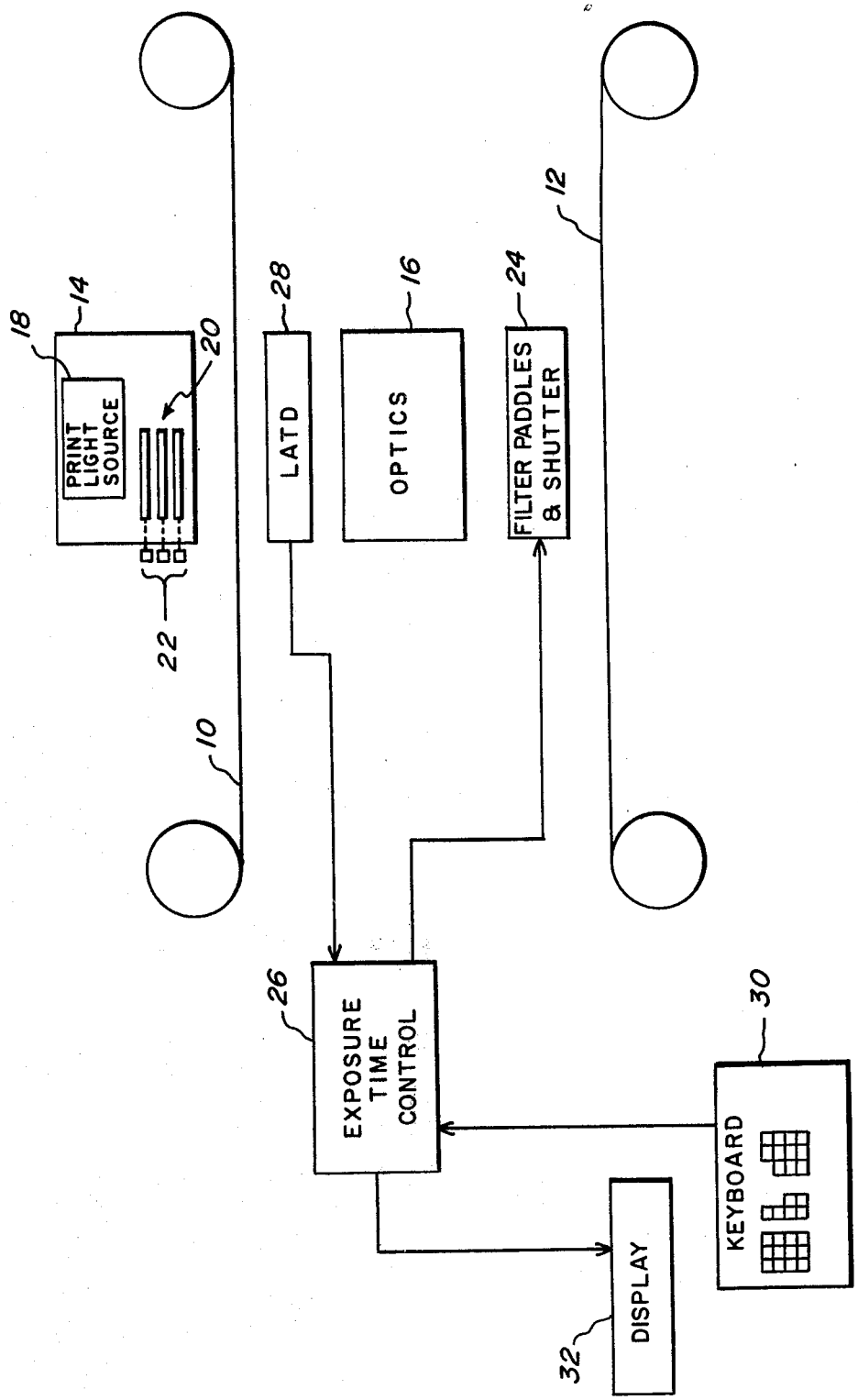
FIG. 1 is a system block diagram illustrating the photographic printer of the present invention.

FIG. 1 illustrates a photographic printer system which utilizes the present invention. In this printer, an image contained in film 10 is printed onto photosensitive paper 12. Light from lamphouse assembly 14 is passed through a frame of film 10 and is focused by optics 16 onto an appropriate portion of paper 12.

In a preferred embodiment of the present invention, lamphouse assembly 14 includes a print light source 18, a plurality of subtractive filters 20, and corresponding adjusting knobs 22. By moving adjusting knobs 22, the corresponding subtractive filters 20 are positioned in the path of light from print light source 18 to adjust the color content of the light.

The exposure time during which paper 12 is exposed to the image from film 10 is determined by the position of filter paddles and shutter 24. The filter paddles typically include a subtractive filter for each color channel (red, green, and blue). Filter paddles and shutter 24 are controlled by exposure control 26.

In the embodiment shown in FIG. 1, exposure control 26 receives input signals from large area transmission density (LATD) sensors 28 and from an operator keyboard 30. Additional sources of input signals, such as density or color sensors (not shown) may also supply signals to exposure control 26.

Display 32 receives signals from exposure control 26 and displays various messages, data, and instructions to the user. In one preferred embodiment, display 32 is a 32 character alpha-numeric display.

Exposure control 26 preferably includes digital processing and storage capabilities. In one preferred embodiment, exposure control 26 includes a microprocessor and associated random access memory (RAM) and read-only memory (ROM) storage. An example of an exposure control system which has successfully utilized the improved color balancing of the present invention is described in the co-pending patent application Ser. No. 848,736 by F. Laciak and J. Poné, Jr. entitled "Exposure Time Control", which was filed on even date and was assigned to the same assignee as the present application.

Figure 2:
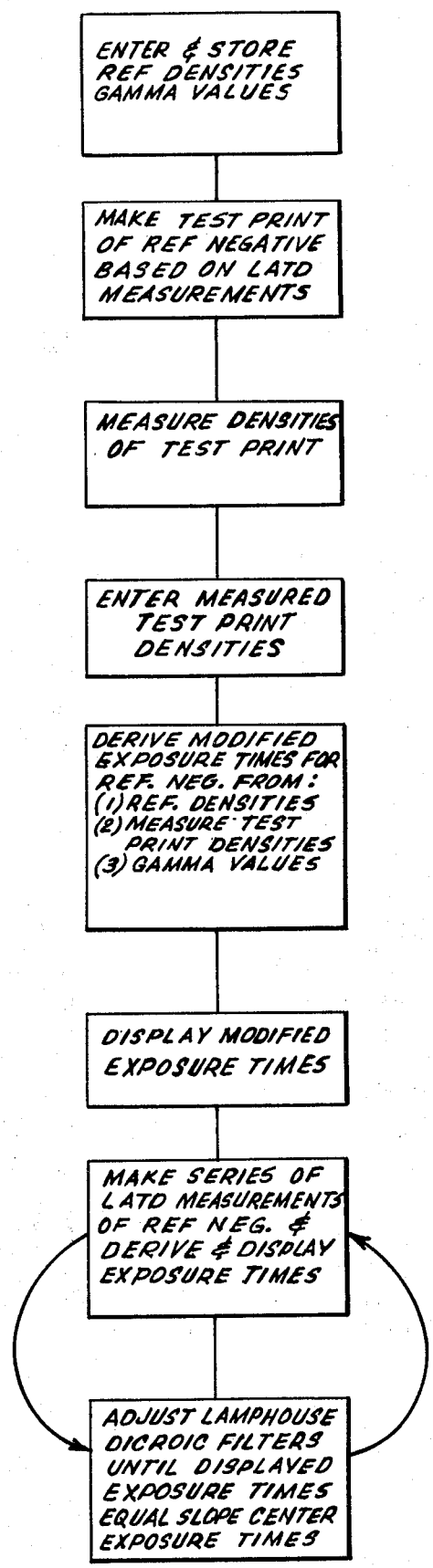
FIG. 2 is an operational block diagram illustrating the preferred embodiment of the color balancing procedures of the present invention.

FIG. 2 illustrates the procedure performed in a preferred embodiment of the color balancing of the present invention. Before color balancing is attempted, the user must first enter certain critical parameters which are stored and used later in the color balancing procedures. In one successful embodiment of the present invention, these critical parameters include desired reference print densities, and photographic paper gammas.

First, display 32 displays "REFER DENSITY=(##) (##) (##)". The user is required to enter three numbers which are the print density aim points for a selected reference negative. The user has determined, from experience, that if the reference negative is printed to these reference densities, most negatives which are printed will yield acceptable quality prints. When the three print density values have been entered by the user, they are displayed by display 32 so that the operator may verify them. Once verified, they are stored by exposure control 26 for later use.

Second, "GAMMA FACTORS=(##) (##) (##)" are displayed. The user is required to enter three numbers which represent gamma of the red, green, and blue emulsion layers of the photographic paper. The measurement of gamma and the use of gamma compensation in a photographic printer is described in further detail in a co-pending patent application Ser. No. 848,739 by J. Pone Jr. entitled "Photographic Printer with Automatic Density and Color Correction for Paper Gamma" which was filed on even date and which is assigned to the same assignee as the present application. After the gamma values have been entered, displayed, and verified, they are stored and used to compensate all subsequent exposure time calculations so that the paper gamma does not affect any corrections which are made.

After the critical parameters have been entered and stored, the user may perform color balancing. The user first makes a test print of the reference negative. This test print has its exposure times controlled by the LATD measurements made by LATD sensors 28.

The user then measures the red, green, and blue densities of the print. If the printer is not color balanced, the measured densities of the test print will differ from the reference densities which were previously stored in exposure control 26.

The user indicates to exposure control 26, through keyboard 30, that he wishes to color balance the system. The exposure control 26 causes display 32 to display "PRESENT BALANCE". The user is then required to enter the measured densities of the test print.

At this point, exposure control 26 compares the stored reference print densities to the measured densities and calculates the time changes which are necessary for the reference negative to print to the reference densities. In performing these calculations, exposure control 26 preferably uses gamma compensation, so that gamma of the photographic paper is taken into account. Exposure control 26 then adds (or subtracts) the necessary time changes to the previously used exposure times based upon measurement of the reference negative densities and displays these modified exposure times.

In a preferred embodiment of the present invention, exposure control 26 uses the following relationships between density, exposure, gamma, intensity and exposure time to achieve the automatic color balancing. For simplicity, the relationships are discussed in the context of a single color channel. It will be understood, that similar derivations are performed for each color channel.

The straight line portion of the D log E curve can be described by the equation:

$$D = \gamma \log_{10} E + K_0$$

when D is resultant print density, $\gamma$ is paper gamma, E is exposure and $K_0$ is a constant. When the printer is being color balanced, the resultant density D is being changed, which is achieved by changing the exposure E. Exposure (E) is equal to exposure time (t) times the intensity (I) of the light passing through the negative.

The initial color balancing calculation is made to reflect a time change for the desired density change, represented by:

$$D_f - D_i = \gamma \log_{10}(I_f t_f / I_i t_i)$$

where f denotes final value and i denotes initial value. For the first calculation $$I_f = I_i$$

since the intensity of light is not changed. The resultant change in exposure time needed to change the test print density from the measured value $D_i$ to the desired value $D_f$, therefore, is expressed and calculated as:

$$\log_{10} t_f - \log_{10} t_i = (D_f - D_i)/\gamma,$$

or $$\log_{10} t_f = (\Delta D/\gamma) + \log_{10} t_i.$$

In our case, $D_f$=stored reference print density values, $D_i$=measured print densities, $t_f$=modified exposure times, and $t_i$=reference exposure times (calculated using the LATD measurements of the reference negative and the initial exposure value $E_i$).

Once the modified exposure times have been derived, the printer has been color balanced, since subsequent printing will use the new exposure value, $E_f = I_f t_f = I_i t_f$. To this point, the intensity of light from the print lamphouse has not been modified, so that $I_f = I_i$. In most cases, however, the displayed modified exposure times ($t_f$) will differ from the desired exposure times required for efficient printing. The user then adjusts the color content of the light from lamphouse assembly 14 (i.e. changed $I_f$ so that it no longer equals $I_i$) by turning adjusting knobs 22. This moves the subtractive filters 20 so that they either filter out a greater amount or a lesser amount of a particular color. While these lamphouse filter adjustments are being made, the printer is in an automatic cycle mode in which measurements are made by LATD sensors 28 and the exposure times are calculated and displayed on display 32. This permits the operator to observe the exposure times as he adjusts the filter positions. The exposure times will change as the filters are moved since $E_f$ is constant and $I_f$ is changing.

The adjusting procedure continues until the desired exposure times are reached. In other words, although exposure $E_f$ is the same value as derived by the color balance calculations, intensity $I_f$ is no longer equal to $I_i$, but rather has been adjusted to yield the desired exposure time (e.g. $t_f = t_i$). At this point, the procedure may be repeated beginning with the printing of another test print from the reference negative. Generally, the entire color balancing procedure does not take more than two or possibly three tests, unless the printer was initially grossly out of balance.

In conclusion, the present invention is a highly effective, yet simple procedure for color balancing a photographic printer. The user is led through the procedure by display 32, and is able to monitor the effects of the adjustments of the subtractive filters, while these adjustments are being made. The procedure usually requires only two or three tests, so that the time required for color balancing is minimized, and the waste of print paper is also reduced.

Although the present invention has been described with reference to preferred embodiments, workers skilled in the art will recognize that changes may be made in form and detail without departing from the spirit and scope of the invention. For example, although the present application has referred to co-pending applications which describe other aspects of a photographic printer which has successfully utilized the color balancing of the present invention, the present invention may be utilized successfully in other printers which do not make use of any of these other inventions. For example, although it is highly preferable to utilize gamma compensation as taught in the co-pending application Ser. No. 848,739 entitled "Photographic Printer with Automatic Density and Color Correction for Paper Gamma," the present invention may also be practiced without gamma compensation with, of course, some reduction in accuracy if the paper gamma values vary from average values. Similarly, exposure control 26 of the present application need not be the specific exposure control described in the previously mentioned co-pending application Ser. No. 848,739 entitled "Exposure Time Control". Any exposure control which is capable of entering and storing critical parameters and deriving exposure times from the measured and reference test print densities and the measured reference negative densities may successfully utilize the present invention.

What is claimed is:

1. A method of color balancing a photographic printer comprising:
   storing desired print density values for a print from a reference film;
   measuring densities of the reference film;
   providing electrical signals indicative of the measured densities of the reference film;
   printing a test print from the reference film based upon the electrical signals indicative of the measured densities of the reference film;
   measuring densities of the test print;
   providing electrical signals indicative of the measured densities of the test print;
   providing electrical signals indicative of the stored desired print density values; and
   deriving modified exposures for the reference film as a function of the electrical signals indicative of the stored desired print density values, the measured densities of the test print, and the measured densities of the reference film.

2. A method of color balancing a photographic printer comprising:
   storing desired print density values for a print from a reference film;
   measuring densities of the reference film;
   printing a test print from the reference film based upon measured densities of the reference film;
   measuring densities of the test print;
   deriving modified exposures for the reference film as a function of the stored desired print density values, the measured densities of the test print, and the measured densities of the reference film;
   measuring densities of the reference film;
   deriving exposure times from the measured densities of the reference film and the modified exposures;
   displaying the derived exposure times; and
   changing the color intensities of printing light while maintaining the modified exposures constant and repeatedly measuring, deriving, and displaying until the displayed exposure times essentially equal desired exposure times.

3. In a photographic printer, the improvement comprising:
   density measuring means for measuring densities of a reference film;
   printing means for printing a test print from the reference film based upon measured densities of the reference film and initial exposures;
   data entry means for receiving, from a user of the photographic printer, desired print density values for the test print and measured print density values for the test print; and
   exposure control means for deriving modified exposures from the desired print density values, the measured print density values, and the measured densities of the reference film, and controlling subsequent printing of the printing means based upon the modified exposures.

4. The invention of claim 3 wherein the exposure control means derives exposure times from the measured densities of the reference film and the modified exposures.

5. The invention of claim 4 and further comprising:
   display means for displaying the derived exposure times.

6. The invention of claim 5 and further comprising:
   print light source means for supplying light for printing; and
   intensity changing means for changing color intensities of the light to change the derived exposure times displayed by the display means to desired exposure times while the modified exposures remain unchanged.

7. The invention of claim 6 wherein the intensity changing means comprises:
   a plurality of subtractive filters; and
   filter position adjusting means for adjusting the positions of the subtractive filters in the path of the light to change the color intensities of the light.

8. A method of color balancing a photographic printer comprising:
   measuring densities of a reference film;
   deriving digital electrical signals indicative of initial exposure times based upon the measured densities;
   printing a test print from the reference film based upon the digital electrical signals indicative of initial exposure times;
   measuring densities of the test print;
   deriving digital electrical signals indicative of modified exposure times from digital electrical signals indicative of the initial exposure times and differences between the measured densities of the test print and desired densities of a print from the reference film; and
   deriving digital electrical signals indicative of modified exposures based upon the modified exposure times.

* * * * *